United States Patent
Cai et al.

(10) Patent No.: US 12,375,329 B2
(45) Date of Patent: Jul. 29, 2025

(54) TRANSITIONING BETWEEN SIGNAL CONSTELLATIONS

(71) Applicant: CREDO TECHNOLOGY GROUP LTD, Grand Cayman (KY)

(72) Inventors: Fang Cai, Milpitas, CA (US); Junqing (Phil) Sun, Fremont, CA (US); Haoli Qian, Fremont, CA (US)

(73) Assignee: CREDO TECHNOLOGY GROUP LTD, Grand Cayman (KY)

( * ) Notice: Subject to any disclaimer, the term of this patent is extended or adjusted under 35 U.S.C. 154(b) by 0 days.

(21) Appl. No.: 17/650,572

(22) Filed: Feb. 10, 2022

(65) Prior Publication Data
US 2023/0254188 A1    Aug. 10, 2023

(51) Int. Cl.
| | |
|---|---|
| *H03K 7/02* | (2006.01) |
| *H03K 9/02* | (2006.01) |
| *H04L 7/00* | (2006.01) |
| *H04L 27/06* | (2006.01) |

(52) U.S. Cl.
CPC ............ *H04L 27/06* (2013.01); *H04L 7/0012* (2013.01)

(58) Field of Classification Search
CPC ...... H04L 27/06; H04L 7/0012; H04L 7/0037
USPC ....... 375/286, 287, 353, 293, 294, 229, 232, 375/345
See application file for complete search history.

(56) References Cited

U.S. PATENT DOCUMENTS

| | | | |
|---|---|---|---|
| 9,337,993 B1* | 5/2016 | Lugthart | ............... H04L 7/0037 |
| 10,212,260 B2 | 2/2019 | Sun | |
| 10,447,509 B1 | 10/2019 | Cai | |
| 11,018,656 B1 | 5/2021 | Sun | |

OTHER PUBLICATIONS

K. Mueller and M. Muller, "Timing Recovery in Digital Synchronous Data Receivers," in IEEE Transactions on Communications, vol. 24, No. 5, pp. 516-531, May 1976, doi: 10.1109/TCOM.1976.1093326.
Musa, "High-speed Baud-Rate Clock Recovery", U. Toronto Thesis, 2008.

* cited by examiner

*Primary Examiner* — Phuong Phu (57) ABSTRACT

Accordingly, there are disclosed herein receivers and receiving methods that provide a graceful transition from PAM2 to PAM4 signaling. One illustrative method includes: negotiating a link speed having PAM4 signaling; performing adaption of at least one gain or filter coefficient during PAM2 signaling; switching to PAM4 detection before receiving PAM4 signaling; disabling said adaptation before said switching to PAM4 detection; detecting PAM4 signaling using at least one statistic of detected PAM4 symbols; and enabling said adaptation after PAM4 signaling is detected. Another illustrative method includes: negotiating a link speed having PAM4 signaling; adapting at least one of gain and filter coefficients during PAM2 signaling; monitoring for a change in at least one signal characteristic while performing PAM2 detection; and transitioning to PAM4 detection after detecting said change.

20 Claims, 6 Drawing Sheets

TRANSITIONING BETWEEN SIGNAL CONSTELLATIONS

TECHNICAL FIELD

The present disclosure relates to digital communications receivers, and more specifically to channel symbol detection methods that facilitate transitions between 2-level and 4-level pulse amplitude modulation.

BACKGROUND

Various standards have been developed to support the need for ever-faster transport of ever-larger data volumes between devices. Fibre Channel is one such standard established by the International Committee for Information Technology Standards (INCITS) for use in storage area networks (SAN), offering data transfer rates that have approximately doubled every three years since 1993. One consequence of this evolution is that the various devices in a given network may be employing multiple generations of the standard. To enable gradual upgrades of network hardware, the Fibre Channel standard suggests that each device should provide backward compatibility with up to three previous generations of the standard, and specifies mechanics of a Link Speed Negotiation (LSN) method that may be employed by linked devices to determine the highest speed supported by both devices on that link.

A link training (LT) phase follows the LSN phase, enabling the transmitter and receiver to optimize their equalization filters, decision thresholds, and clock timing for the negotiated signaling rate and constellation. For the Fiber Channel standards supporting 4-level pulse amplitude modulation (PAM4), the LT phase includes a transition to PAM4 from 2-level pulse amplitude modulation (PAM2, also known as NRZ modulation). For various reasons (including adaptive gain control early in the receive chain), this transition can magnify timing jitter, impair adaptation, and unduly delay or prevent completion of the LT phase.

SUMMARY

Accordingly, there are disclosed herein receivers and receiving methods that provide a graceful transition from PAM2 to PAM4 signaling. One illustrative method includes: negotiating a link speed having PAM4 signaling; performing adaption of at least one gain or filter coefficient during PAM2 signaling; switching to PAM4 detection before receiving PAM4 signaling; disabling said adaptation before said switching to PAM4 detection; detecting PAM4 signaling using at least one statistic of detected PAM4 symbols; and enabling said adaptation after PAM4 signaling is detected.

Another illustrative method includes: negotiating a link speed having PAM4 signaling; adapting at least one of gain and filter coefficients during PAM2 signaling; monitoring for a change in at least one signal characteristic while performing PAM2 detection; and transitioning to PAM4 detection after detecting said change.

Also disclosed are Illustrative receivers that perform the foregoing methods. Each of the foregoing may be combined with any one or more of the following optional features: 1. switching to PAM4 detection includes using adjusted PAM4 detection values that cause PAM2 symbols to be detected only as outer PAM4 symbols. 2. the adjusted PAM4 detection values are scaled by a factor of about 0.8 from nominal PAM4 detection values. 3. said at least one statistic is a rate or count of detected inner PAM4 symbols. 4. said detecting includes determining when said rate or count exceeds a predetermined value. 5. reducing a bandwidth of a clock recovery loop before said switching to PAM4 detection. 6. restoring the bandwidth of the clock recovery loop after PAM4 signaling is detected. 7. retransmitting the detected PAM4 symbols as PAM2 symbols until PAM4 signaling is detected. 8. the at least one signal characteristic is a probability distribution of equalization error. 9. the at least one signal characteristic is a range of equalization error. 10. the at least one signal characteristic is a probability distribution of an equalized signal. 11. the at least one signal characteristic is a range of an equalized signal.

DETAILED DESCRIPTION

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

Figure 1A:
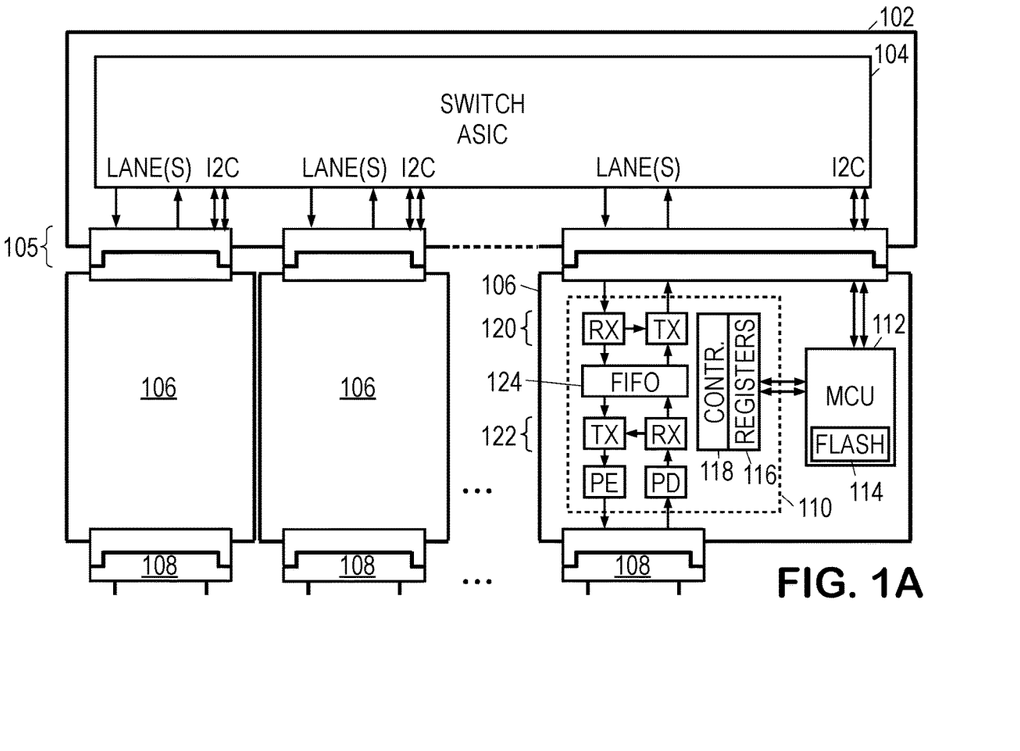
FIG. 1A is a block diagram of an illustrative switch.

For context, FIG. 1A shows an illustrative switch 102. (As used herein, the term "switch" includes not just traditional network switches, but also routers, network bridges, hubs, and other devices that forward network communication packets between ports.) Illustrative switch 102 includes an application-specific integrated circuit (ASIC) 104 that implements packet-switching functionality. ASIC 104 receives and sends network communication packets via port connectors 105. The port connectors 105 couple directly or indirectly to cable connectors 108.

Pluggable modules 106 are often used to couple between the port connectors 105 and the cable connectors 108 to improve communications performance by way of equalization and optional format conversion (e.g., converting between electrical and optical signals). The pluggable modules 106 may comply with any one of various pluggable module standards including SFP, SFP-DD, QSFP, QSFP-DD, and OSFP.

The pluggable modules 106 may each include a data recovery and remodulation (DRR) chip 110 and a microcontroller chip 112 that controls operation of the DRR chip 110 in accordance with firmware and parameters that may be stored in nonvolatile memory 114. The operating mode and parameters of the pluggable modules 106 may be set via a two wire bus such as 12C or MDIO that connects the microcontroller chip 112 to the host device (e.g., switch 102). The microcontroller chip 112 responds to queries and commands received via the two wire bus, and responsively retrieves information from, and saves information to, control registers 116 of the DRR chip 110.

DRR chip 110 includes a host-side transceiver 120 coupled to a line-side transceiver 122 by first-in first-out (FIFO) buffers 124. FIG. 1A shows optional photoemitter (PE) and photodetector (PD) elements to convert between optical and electrical line-side signals. Though the figure shows only a single lane for the DRR chip transceivers, the transceivers may support multiple lanes conveyed via multiple corresponding optical fibers or electrical conductors. A controller 118 coordinates the operation of the transceivers in accordance with the control register contents, and may provide for multiple communication phases pursuant to a communications standard such as the Fibre Channel Standard published by the American National Standard for Information Technology Accredited Standards Committee INCITS, which provides phases for link speed negotiation (LSN), link training (LT), and normal operation.

Figure 1B:
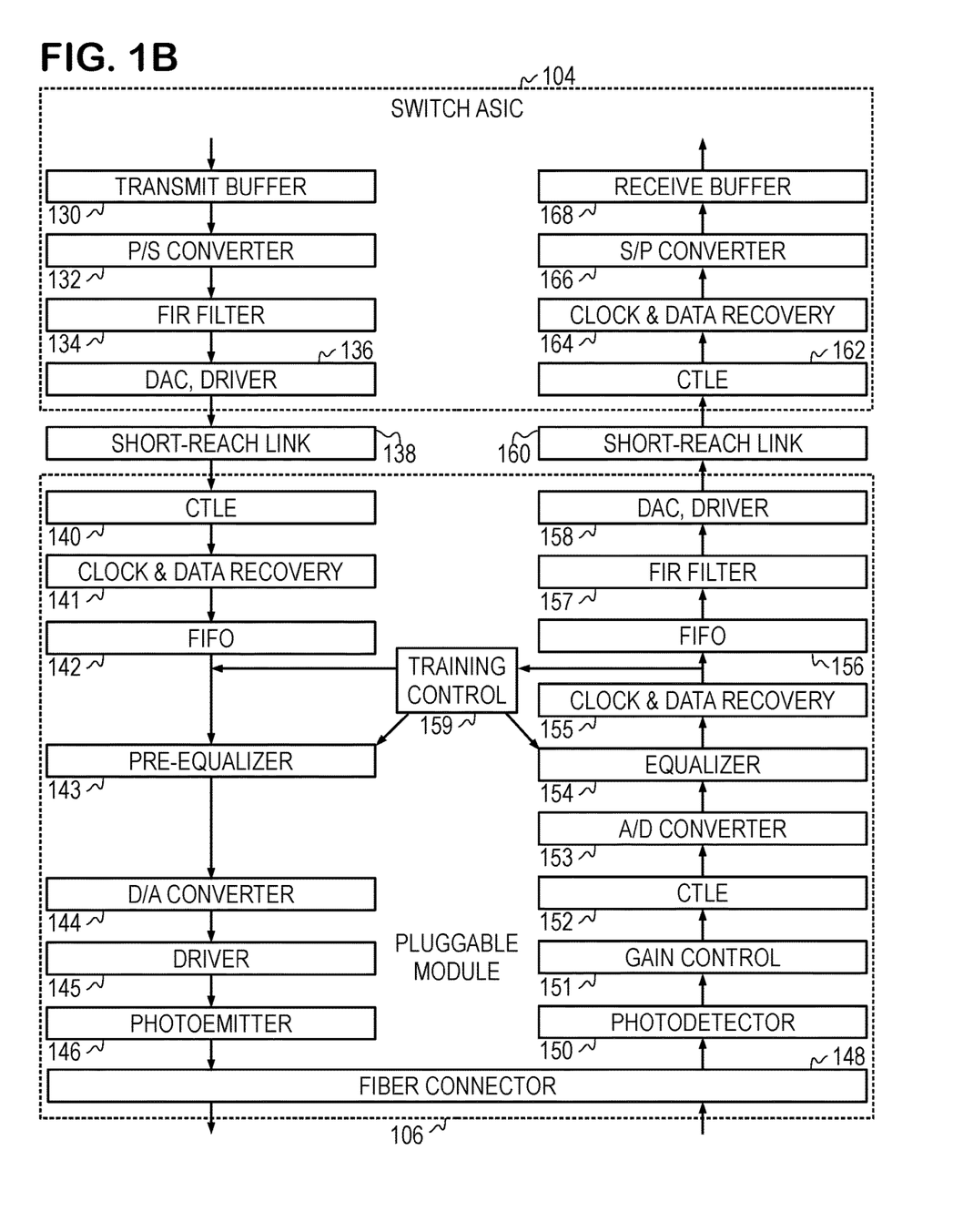
FIG. 1B is a block diagram of an illustrative switch port.

FIG. 1B shows an example of the components making up the transmit (egress) and receive (ingress) chains for one of the switch ports, including the pluggable module 106. Though the components are shown and described here using function blocks, it should be understood that the blocks represent integrated circuit modules that can be found in the academic literature and which are commercially available in component libraries of various ASIC design software packages and/or implementable as firmware executable by programmable controllers or processing units.

For each lane, the switch ASIC provides a transmit buffer 130 to buffer the digital transmit data, which is typically received in blocks of bits or multi-bit symbols. A parallel-to-serial converter 132 accesses the buffer to produce, in this example, a serialized stream of NRZ (non-return to zero) or PAM4 (4-level pulse amplitude modulation) symbols. Other example implementations may produce a stream of channel-encoded bits or other symbols. The symbol stream is preferably compliant with a standard protocol such as the transmission protocol of the Fibre Channel standard including Transmission Words and Ordered Sets (patterns for special functions such as delimiting frames and aligning lanes).

An optional finite impulse response (FIR) filter 134 may be used to provide pre-emphasis of high frequency components to combat attenuation of the short reach link 138. A digital-to-analog converter (DAC) converts the filtered signal to analog form and a driver 136 supplies sufficient current to convey the transmit signal across the short-reach link 138 to the pluggable module 106. The short-reach link 138 primarily consists of conductive printed circuit board traces coupling the switch ASIC to the DRR chip 110 via port connector 105. Though the traces may be limited to, say, less than 500 mm, they may nevertheless be expected to cause significant frequency-dependent attenuation and dispersion at the upper range of signal frequencies contemplated here.

In the pluggable module 106, a continuous time linear equalizer (CTLE) filter 140 cooperates with the optional FIR filter 134 to compensate for the effects of the short-reach link 138. A clock and data recovery (CDR) module 141 operates on the filtered signal to derive a clock signal for sampling and re-digitizing the digital symbol stream. An optional FIFO buffer 142 receives the digital symbol stream from the CDR module. An optional pre-equalizer 143 operates on the digital symbol stream to at least partly compensate for the line-side channel effects. A DAC 144 converts the pre-equalized signal to an analog signal, which the driver 145 for the photoemitter amplifies to drive the photoemitter 146. The fiber connector 148 couples the optical signal from the photoemitter to an optical fiber for conveyance to a remote photodetector and receiver.

We note here that pre-equalization generally increases signal energy in those frequency ranges where the channel signal attenuation is highest, thereby increasing the amount of signal energy dissipation within the channel, in addition to necessitating power consumption by the pre-equalizer 143 itself. For the contemplated channels, however, this increased power consumption is small in comparison to the achievable power savings resulting from associated reductions in receiver complexity, particularly the power savings that can be achieved with the equalizer design.

In the pluggable module 106, the fiber connector 148 further couples optical fibers to associated photodetectors 150, which convert the optical receive signals into electrical form, typically a receive signal current that can be converted to a receive signal voltage by a transimpedance amplifier (TIA). A gain control amplifier 151 applies an adjustable gain to optimize the receive signal range for processing by the subsequent components of the receive chain. A CTLE filter 152 provides anti-aliasing and optional spectral shaping prior to signal digitization by analog-to-digital converter 153. A digital equalizer 154 provides adaptive equalization, cooperating with the remote pre-equalizer to compensate for channel effects. A CDR module 155 derives a sampling clock signal and recovers a receive symbol stream from the equalized signal. An optional FIFO buffer 156 receives the digital receive symbol stream from the CDR module 155.

Pluggable module 106 further includes an optional FIR filter 157 to provide pre-emphasis of high frequency components to combat attenuation of the short reach link 160. A digital-to-analog converter (DAC) converts the filtered signal to analog form and a driver 158 supplies sufficient current to convey the transmit signal across the short-reach link 160 to the ASIC 104, where CTLE filter 162 cooperates with the optional FIR filter 157 to compensate for the effects of the short-reach link 160. A clock and data recovery (CDR) module 164 operates on the filtered signal to derive a sample clock signal for recovering the receive symbol stream. A serial-to-parallel converter 166 stores blocks of the receive symbol stream in a receive buffer 168, enabling the use of lower clock rates by the core circuitry of the ASIC 104.

Pluggable module 106 further includes a training control module 159 to adapt coefficients of the pre-equalizer module 143 and equalizer 154. The training control module 159 may generate a sequence of training frames that take the place of the transmit data stream for the duration of a link speed negotiation and link speed training phases, and may detect equalization errors associated with training frame symbols in the receive data stream. Combining the equalization errors with the training frame symbols, the training controller 159 can adapt the coefficients of a remote pre-equalizer and local equalizer 154 to optimize their combined compensation of the combined receive channel effects. Training controller 159 can communicate the remote pre-equalizer coefficient updates via various backchannel options including, e.g., dedicated fields in the training frames of the transmit symbol stream. Correspondingly, training controller 159 can extract updates for the local pre-equalizer 143 from dedicated fields in the frames of the receive symbol stream. For further details of one illustrative example, see, e.g., co-owned U.S. Pat. No. 10,212,260 "SerDes Architecture with a Hidden Backchannel Protocol", which is hereby incorporated herein by reference.

Figure 1C:
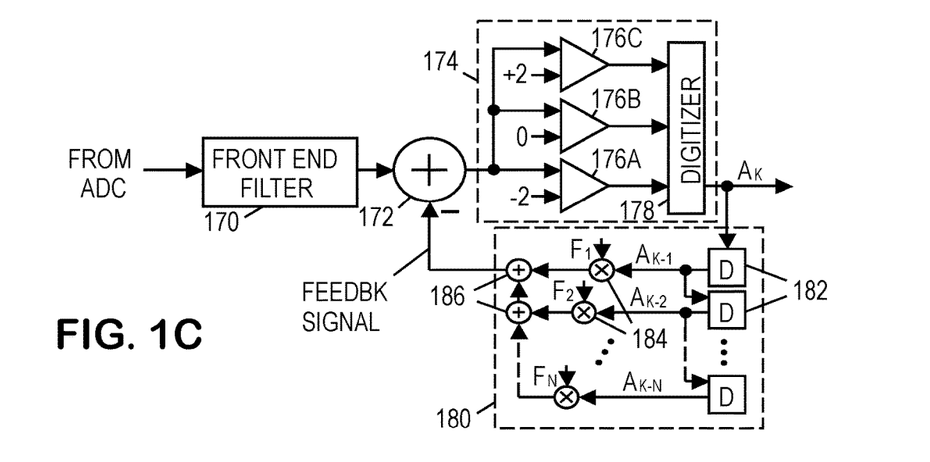
FIG. 1C is a block diagram of an illustrative decision feedback equalizer (DFE).
Figure 1D:
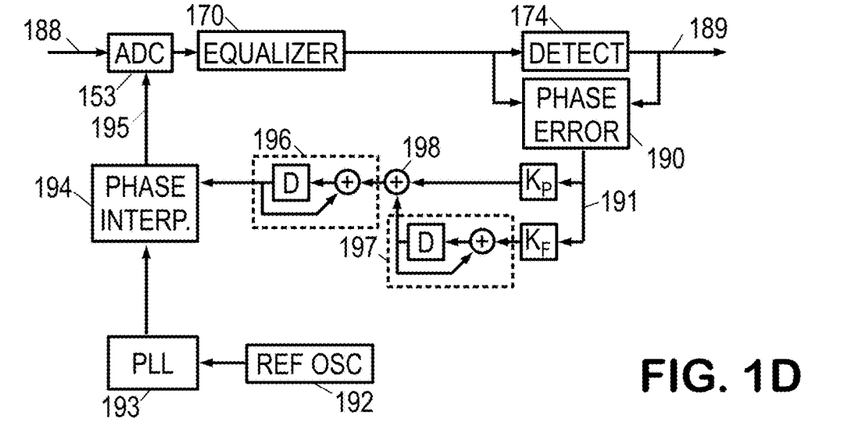
FIG. 1D is a block diagram of an illustrative clock recovery module.

For further context, FIGS. 1C and 1D provide additional detail regarding an illustrative implementation of equalizer 154 and CDR module 155. In FIG. 1C, a digital feed-forward equalization (FFE) filter 170 (shown in the figures as "front end filter 170") filters the digitized receive signal to reduce leading intersymbol interference. A summer 172 combines the filtered receive signal with a feedback signal to provide an equalized signal to a decision element 174. The decision element 174 employs an array of comparators 176 to decide which channel symbol the equalized signal most probably represents. The comparator outputs may optionally be converted into a binary symbol decision by a digitizer 178. Alternatively, the comparator outputs may be used as a thermometer-coded representation of the symbol decisions.

A feedback filter (FBF) 180 uses a chain of delay elements 182 with corresponding multipliers 184 and summers 186 to convert the symbol decisions from the decision element 174 into a feedback signal, which corrects for trailing intersymbol interference in the filtered receive signal. This equalization and detection arrangement is known as decision feedback equalization (DFE), and it yields a stream of symbol decisions. Some receiver variations employ oversampling in the FFE 170 and FBF 180.

FIG. 1D shows an illustrative implementation of the timing recovery loop. ADC 153 samples the analog receive signal 188 using the sampling clock 195 and provides a digital receive signal to the equalizer 170 (which may be a DFE as previously described, a FFE filter, or some other form of equalizer). A decision element 174 converts the equalized signal into a digital receive symbol stream 189.

A timing error unit 190 derives a timing error signal 191 using any suitable design for the timing error estimator including, e.g., a bang-bang or proportional phase detector. One illustrative timing error estimator is set forth in co-owned patent U.S. Pat. No. 10,447,509, "Precompensator-based quantization for clock recovery", which is hereby incorporated herein by reference in its entirety. Other potentially suitable timing error estimators can be found in the open literature, including, e.g., Mueller, "Timing Recovery in Digital Synchronous Data Receivers", IEEE Trans. Commun., v24n5, May 1976, and Musa, "High-speed Baud-Rate Clock Recovery", U. Toronto Thesis, 2008.

The sampling clock signal is optionally derived using a phase lock loop (PLL) 193 from a reference clock signal provided by a reference oscillator 192. A phase interpolator 194 operates on the PLL clock signal to correct for phase and frequency offsets in the sampling clock signal 195. The timing error signal 191 is used to control the phase interpolator 194 in a fashion that statistically minimizes the energy of the timing error signal. In a first feedback path, the timing error signal is scaled by a phase coefficient ($K_P$) and integrated by a phase error accumulator 196 to obtain a phase error signal, which is supplied as a control signal to the phase interpolator 194. In a second feedback path, the timing error signal is scaled by a frequency coefficient ($K_F$) and integrated by frequency error accumulator 197 to obtain a frequency offset signal. A summer 198 adds the frequency offset signal to the scaled timing error signal, supplying the sum to the phase error accumulator 196 to correct for the offsets.

Figure 2:
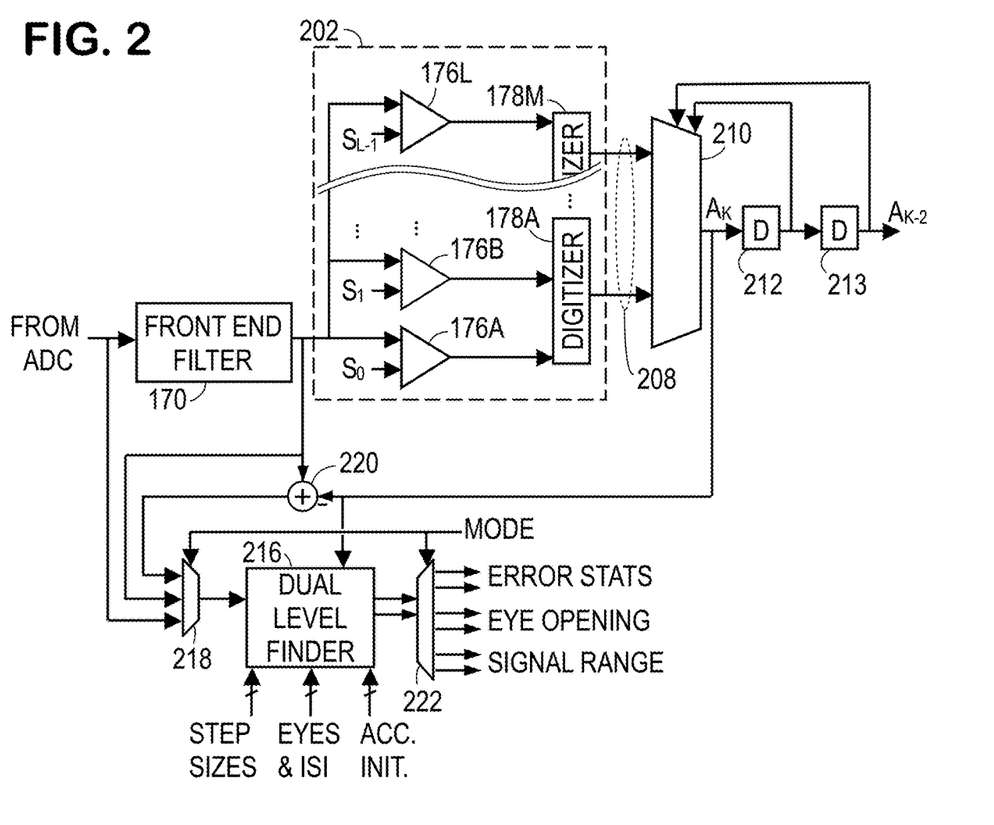
FIG. 2 is a block diagram of an illustrative "unrolled" DFE.

FIG. 2 shows an alternative receiver implementation with additional implementation detail. In this alternative implementation, the decision element 174 is replaced with a precompensation unit 202, which employs additional comparators 176 with thresholds $S_0$-$S_{L-1}$ that have been adjusted to speculatively account for each possible feedback signal value. Digitizers 178 optionally convert the comparator outputs into a group of tentative symbol decisions 208. A multiplexer 210 selects the proper one of the tentative decisions based on the preceding symbol decisions stored in delay elements 212, 213. As explained in co-owned patent U.S. Pat. No. 11,018,656 ("Multi-function level finder for SerDes", issued 2021 May 25 and hereby incorporated herein by reference), this arrangement eliminates the feedback filter, potentially enabling operation at higher baud rates.

A multi-function level finder augments the operation of the DFE in FIG. 2, and would also be suitable for use with the FIG. 1C implementation as well as other equalizer types. The illustrated multi-function level finder is a dual level finder 216 with an input multiplexer 218 and an output de-multiplexer 222. Based on a mode selection signal, the input multiplexer 218 selects one of multiple signals from different stages of the equalizer. In FIG. 2, the signals are the receive signal, the slicer input signal, and an error signal, but may further or alternatively include signals from other stages of the equalizer. The receive signal is the input to the FFE filter 170, the slicer input signal is the receive signal as modified by the FFE filter 170 (and by the output of the feedback filter, if present), and the error signal is the difference between the slicer input signal and the corresponding output symbol decision. The summer 220 may include an appropriate delay for the slicer input signal to ensure that the error is determined correctly.

As described in U.S. Pat. No. 11,018,656 ("Multi-function level finder for SerDes"), the level finder is an adaptive controller that employs asymmetric step sizes to find a threshold at which the selected signal's cumulative probability distribution function (CDF) reaches a given value. A dual level finder enables two such thresholds to be determined concurrently. The dual level finder 216 operates on the selected signal using the input parameters (step sizes, eye edge and/or ISI selections, accumulator initializations, and symbol decisions) to measure the correspondingly conditioned signal levels. Among other things, the dual level finder output may represent the receive signal range, the size of a selected eye opening, or an error distribution measure. These levels may be determined conditionally (e.g., measured only for specific symbol decision values or patterns) or unconditionally (i.e., measured without regard to symbol decisions or patterns).

As one example the dual level finder can determine the equalization error range for any given symbol decision value. To determine the range of the equalization error, the mode select signal causes the multiplexer 218 to forward the error signal to the dual level finder 216. The dual level finder is programmed to find a first threshold at which the signal CDF is, say, $1/128$ (meaning that the receive signal exhibits only about 0.78% chance of falling below that threshold) and a second threshold at which the signal CDF is, say, $127/128$ (meaning that the signal only exceeds that threshold only about 0.78% of the time). These two thresholds then represent the signal range within which the signal can be found 98% of the time. The thresholds are forwarded to an appropriate register by demultiplexer 222, and may be used by a controller 118 or training controller 159 to perform adaptive gain control and/or detection of signal constellation transitions as described further below.

With the foregoing context of an illustrative implementation, we now turn to the Link Speed Negotiation (LSN) phase of establishing a Fibre Channel link between link partners, say, switches or other host devices that comply with different generations of the Fibre Channel standard. Pursuant to the standard, LSN phase includes each link partner's transmitter sending training signals at progressively lower baud rates until the receiver determines that the signal can satisfactorily received and notifies the transmitter accordingly. For its part, the receiver iterates through its supported baud rates, testing to see whether any of them match the currently transmitted training signal. PAM2 (NRZ) signaling is used during the LSN phase, but the link partners can agree to use PAM4 signaling for subsequent communications.

The LSN phase concludes after the two ends of a link agree on a baud rate and signal constellation (PAM2, PAM4). Thereafter, the Fibre Channel standard provides for a Link Training (LT) phase, during which training patterns are sent to enable the link partners to adaptively optimize their gain settings and filter coefficients. For the Fiber Channel standards supporting PAM4, the LT phase includes a transition from PAM2 to PAM4. If this transition is not handled gracefully, the receiver would likely be unable to complete the LT phase in PAM4 and would consequently be forced to employ a Fibre Channel standard with a reduced data transfer rate.

Figure 3A:
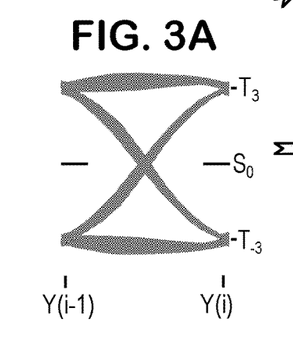
FIG. 3A is an illustrative PAM2 (aka NRZ modulation) eye diagram with optimized PAM2 detection values.

FIG. 3A is an illustrative PAM2 eye diagram with optimized PAM2 detection values. The right side of each eye diagram represents the potential equalized signal values at a current decision time, Y(i), while the left side represents the potential signal values at a preceding decision time, Y(i−1). The eye diagram results from overlaying many symbol intervals to observe the variations associated with all possible transitions between adjacent symbols. Thicker areas represent larger variations typically attributable to nonlinearities, noise, and/or jitter. Adaptation of filter coefficients and gain optimizes the equalized signal alignment with target values at the decision times. (For consistency with PAM4, the outermost target values are shown here as $T_{-3}$, $T_3$.) To minimize error probability, the optimal slicer threshold So is positioned midway between the inner edges of the eye opening.

Figure 3B:
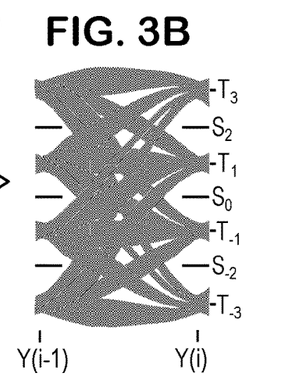
FIG. 3B is an illustrative PAM4 eye diagram with optimized PAM4 detection values.

FIG. 3B (right side of the drawing sheet) is an illustrative PAM4 eye diagram with optimized PAM4 detection values. It is often the case that receive amplifiers (e.g., photodetectors with transimpedance amplifiers) will automatically adjust their gain to maintain the average signal power at a constant level. Such gain control strategies cause the amplitude of outermost PAM4 signals to be about 34% larger than PAM2 signal amplitudes. The associated receiver would accordingly need to quickly adapt the receiver gain or, equivalently, adjust the outmost PAM4 target values $T_{-3}$, $T_3$ to 1.34 times those of the PAM2 signal amplitudes. For the present example, the receiver gain is held constant. The innermost target values $T_{-1}$, $T_1$ are ⅓ the amplitude of the outermost target values $T_{-3}$, $T_3$. The slicer thresholds $S_{-2}$, $S_2$, are nominally at ⅔ of the outermost target values, while slicer threshold is nominally at 0. In practice, the slicer thresholds are adjusted midway between eye edges to minimize error probability.

During the LT phase, a receiver expecting a transition from PAM2 signaling to PAM4 signaling may either (1) continue operating in PAM2 detection mode until PAM4 signaling is detected, or (2) begin operating in PAM4 detection mode while still receiving PAM2 signaling. In either case, there will be a period of mismatch between the eye diagram and the employed slicer thresholds and target values.

Figure 3C:
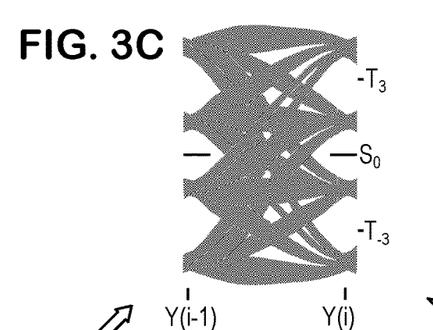
FIG. 3C is an illustrative PAM4 eye diagram with PAM2 detection values.
Figure 4:
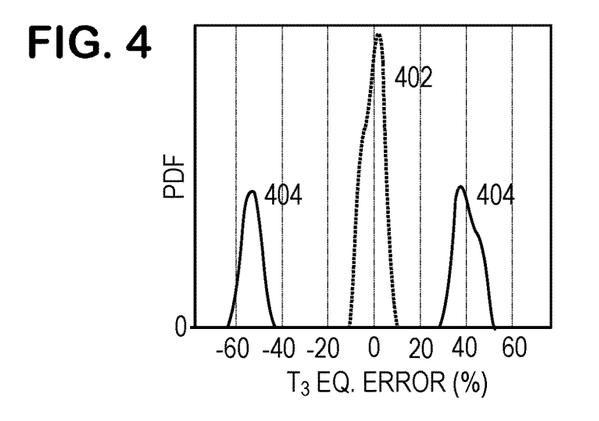
FIG. 4 is an illustrative probability distribution graph of PAM2 equalization error.

FIG. 3C illustrates the mismatch that occurs with the first option, with an illustrative PAM4 eye diagram being received while the receiver is operating in PAM2 detection mode. The signal values at the current decision time diverge substantially from the target values $T_{-3}$, $T_3$. Referring momentarily to FIG. 4, the equalization error (difference between the equalized signal and the target value) for $T_3$ changes from a single-peaked distribution 402 to a double-peaked distribution 404. Note that the median equalization error value is no longer at zero, creating a potential issue with timing recovery.

Nevertheless, the change in equalization error distribution, or alternatively the change in signal range, can be detected using the dual level finder described previously. For example, the $T_3$ equalization error range as detected using the 1/128 and 127/128 CDF levels for the distributions in this figure would increase quickly from ~20% to ~110% when PAM4 signaling begins. The receiver may use this change to detect the arrival of PAM4 signaling, triggering a change to PAM4 detection mode with the appropriate slicer thresholds and target values shown in FIG. 3B. To speed the subsequent training, the level finder measurements may be used to set the initial values of the slicer thresholds and targets.

Figure 3D:
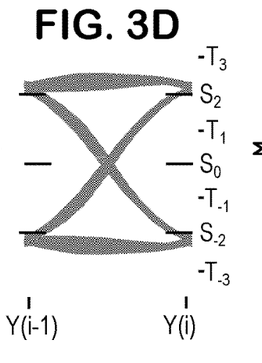
FIG. 3D is an illustrative PAM2 eye diagram with optimized PAM4 detection values.

FIG. 3D illustrates the mismatch that occurs with the second option, with illustrative PAM4 detection values being applied to a PAM2 eye diagram. Unfortunately, the anticipated slicer thresholds $S_{-2}$, $S_2$ are nearly aligned with the upper and lower PAM2 signal amplitudes, which also represents an equilibrium position for these thresholds. This slicer position would cause false detection of PAM4 symbols from the PAM2 eye diagram, with even more unbalanced equalization error distributions than before, potentially magnifying timing jitter to a level that could force the decision timing into the transition region and prolong or prevent successful training. Thus this approach is undesirable if attempted with ideal or anticipated PAM4 detection values.

Figure 3E:
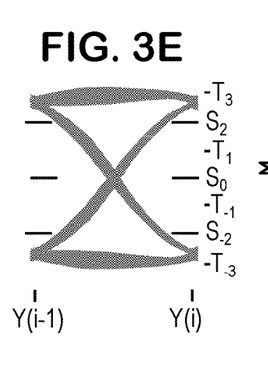
FIG. 3E is an illustrative PAM2 eye diagram with adjusted PAM4 detection values.
Figure 3F:
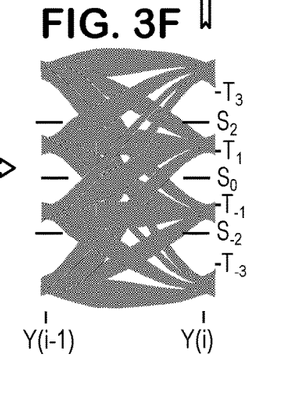
FIG. 3F is an illustrative PAM4 eye diagram with adjusted PAM4 detection values.

A better approach is to employ adjusted PAM4 detection values such as those shown in FIG. 3E. In this example, the anticipated PAM4 detection values have been scaled by 0.8. Taking the nominal value of the PAM2 target values as A, the scaled PAM4 detection values in this example are $T_{-3}$=−1.07 A, $S_{-2}$=−0.72 A, $T_{-1}$=−0.36 A, $S_0$=0, $T_1$=0.36 A, $S_2$=0.72 A, and $T_3$=1.07 A. While the scale factor can vary, the chosen value preferably balances the equalization error distribution for PAM2 and PAM4 signaling and maintains the slicer thresholds $S_{-2}$, $S_2$ comfortably within the correct eye when PAM4 signaling begins. During PAM2 signaling, the receiver employing the adjusted PAM4 detection values detects only channel symbols ±3. As shown in FIG. 3F, once PAM4 signaling begins with the adjusted PAM4 detection values the receiver properly detects all four channel symbols ±1, ±3, thereby enabling a quick detection of the transition and facilitating successful training on the PAM4 signals. The transition from the detection levels in FIG. 3F to the levels in FIG. 3B can be achieved through simple adaptation or may be expedited using initial values determined based on measurements by the level finder.

Figure 5:
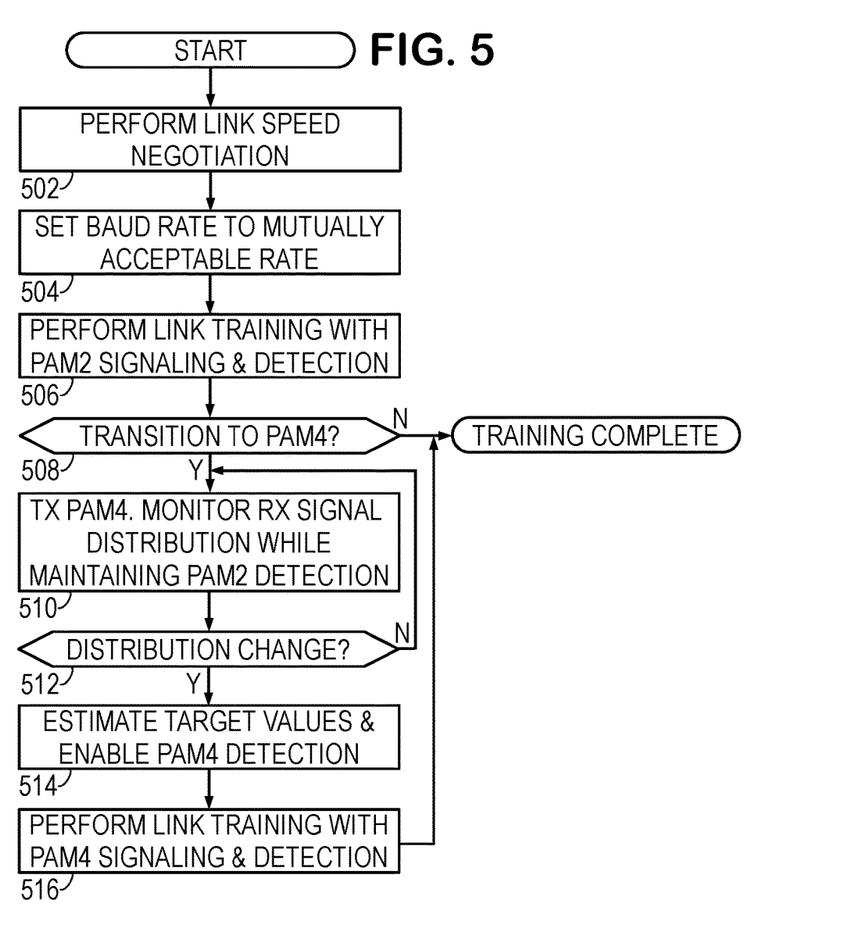
FIG. 5 is a flow diagram of a first illustrative signal constellation transition method.

FIG. 5 is a flow diagram of a first illustrative signal constellation transition method that may be implemented by the host, the chip controller 118, the training controller 159, or any combination thereof. The method begins in block 502 with performing the LSN phase when the link connection is initiated. As part of the LSN phase, the controller determines the highest baud rate and largest signal constellation supported by the link partners and in block 504 coordinates with the remote controller to begin operating at that baud rate. In block 506, the LT phase begins with both ends of the link exchanging PAM2 training patterns and adapting their filter coefficients and gain settings to optimize performance.

In block 508, the controller checks whether the PAM4 signal constellation was determined to be mutually supported in block 504, and if not, the LT phase is concluded. Otherwise, the controller determines that a signal constellation transition is expected, and proceeds to block 510.

In block 510, the controller configures the transmitter to begin sending PAM4 training patterns, but retains the PAM2 detection values for receiving. The level finder is configured to monitor the receive signal statistics, e.g., the signal range (conditional or unconditional), the equalization error range (conditional or unconditional), or some other signal characteristic such as peaks of the probability distribution. In block 512, the controller periodically determines whether the signal statistics exhibit for some change indicating that PAM4 signaling is being received. Control returns to block 510 until such a change is detected.

Once PAM4 signaling is received, in block 514 the controller determines initial PAM4 detection values, preferably based on the level finder measurements. As one example, the controller determines the full signal range, and sets the initial target values $T_{-3}$, $T_3$ near the lower and upper ends of the full signal range, with $S_0$ set at the midpoint, $S_{-2}$, $S_2$ set ⅔ of the way between $S_0$ and $T_{-3}$, $T_3$, and $T_{-1}$, $T_1$ set ⅓ of the way between $S_0$ and $T_{-3}$, $T_3$. The receiver then employs the PAM4 detection values as a starting point for PAM4 link training in block 516. As an alternative to using preset ratios, the controller averages filtered signal values associated with signal patterns chosen to cancel trailing ISI effects.

Where filter coefficient $f_1$ (see FIG. 1C) is nonzero, the associated trailing ISI effects are canceled by averaging the filtered signal values associated with symbol decisions $[A_k, A_{k-1}]$ with $A_{k-1}$ being 3 and −3. Target value $T_3$ is then an average of the filtered signal values associated with [3,3] and [3,−3]. (To combat noise, many such values may be included in the average.) Target value $T_1$ is an average of the filtered signal values associated with [1,3] and [1,−3]. Target values $T_{-1}$, $T_{-3}$ can be similarly determined or taken as the negatives of the $T_1$, $T_3$ values. Slicer values can be initially positioned midway between the appropriate target values.

The foregoing method is expected to be robust, but may present an unavoidable delay associated with measuring the signal statistics. In contrast, the method set forth in FIG. 6, though potentially more complex, may facilitate a faster detection of PAM4 signaling. Blocks 502-508 are the same as for the method of FIG. 5. Once the controller determines that a signal constellation transition is expected, it disables adaptation of the gain and filter coefficients in block 610 to prevent maladaptation due to an unbalanced distribution of equalization error.

Figure 6:
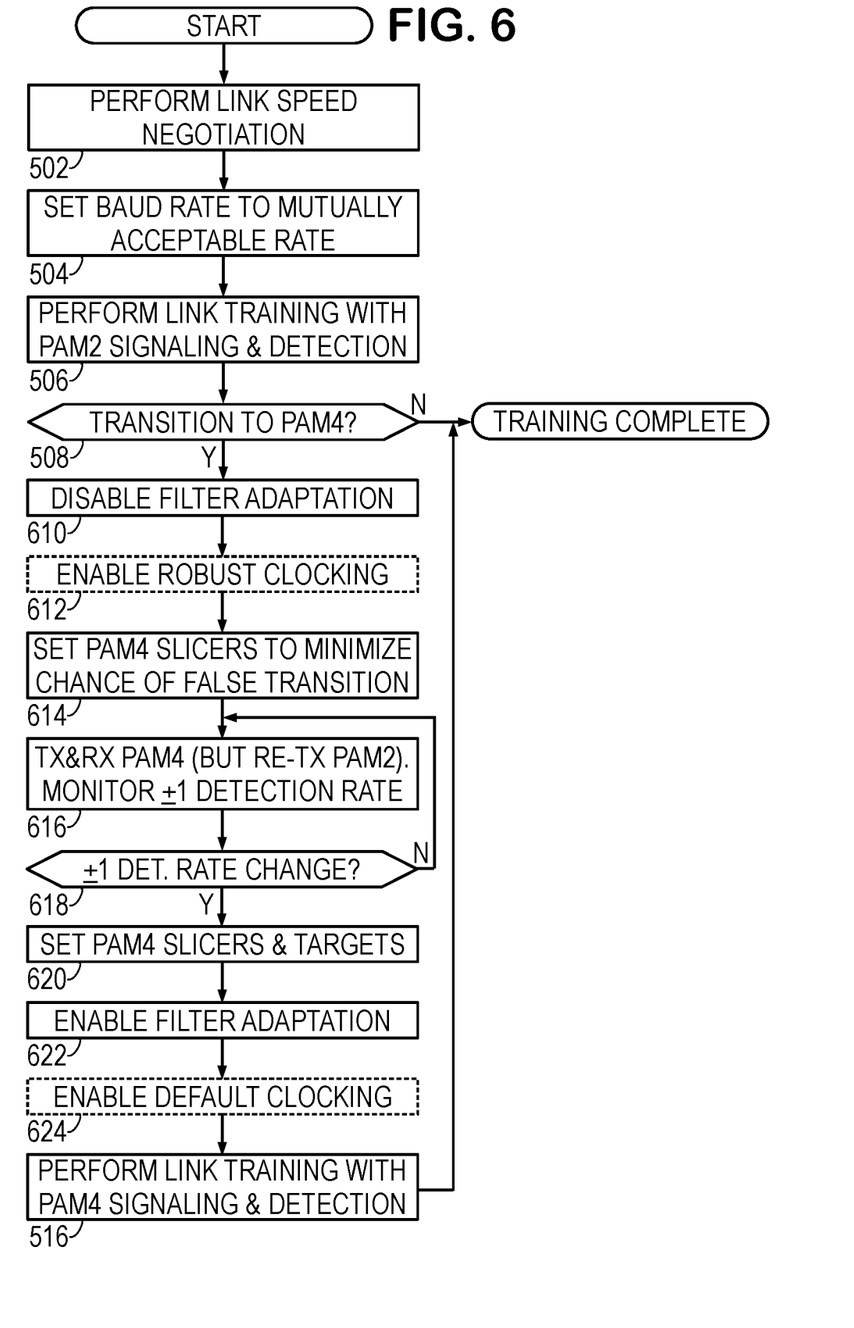
FIG. 6 is a flow diagram of a second illustrative signal constellation transition method.

In block 612, the receiver optionally increases clocking recovery robustness to enhance resistance to increased equalization error energy which could lead to potential loss of synchronization when PAM4 detection is employed for PAM2 signals as previously illustrated in FIG. 3E. The robustness can be increased by, e.g., reducing bandwidth of the timing recovery loop. Alternatively, the receiver may configure phase error estimator 190 to use a different timing error estimation strategy that may be expected to perform better for this transition phase.

In block 614, the controller configures the decision element to use adjusted PAM4 detection thresholds as discussed previously in connection with FIG. 3E. In block 616, the line-side transmitters are configured to begin transmitting PAM4 training patterns while the adjusted PAM4 detection thresholds are used for receiving. Though the DRR chip employs PAM4 detection for the line-side receivers, the channel symbols retransmitted by the host-side transmitters are preferably limited to PAM2 symbols until PAM4 signaling is detected.

Because the slicer thresholds $S_{-2}$, $S_2$ are positioned comfortably inside the outer PAM2 signal amplitudes, it is expected that the receiver will detect only ±3 channel symbols until the PAM4 signals are received (FIG. 3F), at which point half of the detected channel symbols are expected to be ±3 while the remaining half are expected to be ±1 channel symbols. The receiver may accordingly detect that PAM4 signaling has begun by counting the detected ±1 symbols in block 616. Once a predetermined number, say 16, of the ±1 symbols have been received, the receiver may in block 618 decide that PAM4 signals are being received and proceed to block 620. Otherwise, control returns to block 616.

As an alternative to simple counting, the receiver may take a moving average of the absolute value of the channel symbols. While PAM2 signaling persists, the moving average is expected to be at or very near 3. Once PAM4 signaling begins, the moving average is expected to quickly converge to 2. The window length of the moving average filter may be approximately 32, though of course other lengths would also be suitable.

In block 620, sets the unadjusted PAM4 detection values to predetermined values or values determined using the level finder to determine appropriate positions (FIG. 3B). Alternatively, the adjusted detection values are used as the initial values for adaptation. In block 622, the controller enables gain and filter coefficient adaptation, and optionally returns to the default clock recovery configuration in block 624. Thereafter the receiver performs link training with PAM4 signaling and detection in block 516.

Numerous alternative forms, equivalents, and modifications will become apparent to those skilled in the art once the above disclosure is fully appreciated. For example, the above-described disabling of adaptation, tuning, or optimizing can be variously achieved by setting the error scaling factor to zero, by zeroing the update step size, by "freezing" the relevant integrator(s), or by storing and reverting to accumulated error values. It is intended that the claims be interpreted to embrace all such alternative forms, equivalents, and modifications that are encompassed in the scope of the appended claims.

What is claimed is:

1. A receiving method that comprises:
   negotiating a link speed having PAM4 signaling;
   performing adaption of at least one gain or filter coefficient during PAM2 signaling;
   switching to PAM4 detection before receiving PAM4 signaling;
   disabling said adaptation before said switching to PAM4 detection;

detecting PAM4 signaling using at least one statistic of detected PAM4 symbols;
enabling said adaptation after PAM4 signaling is detected; and
retransmitting the detected PAM4 symbols as PAM2 symbols until PAM4 signaling is detected.

2. A receiving method that comprises:
negotiating a link speed having PAM4 signaling;
performing adaption of at least one gain or filter coefficient during PAM2 signaling;
switching to PAM4 detection before receiving PAM4 signaling, said switching to PAM4 detection including using adjusted PAM4 detection values that cause PAM2 symbols to be detected only as outer PAM4 symbols;
disabling said adaptation before said switching to PAM4 detection;
detecting PAM4 signaling using at least one statistic of detected PAM4 symbols; and
enabling said adaptation after PAM4 signaling is detected.

3. The method of claim 2, wherein the adjusted PAM4 detection values are scaled by a factor of about 0.8 from nominal PAM4 detection values.

4. The method of claim 2, where said at least one statistic is a rate or count of detected inner PAM4 symbols.

5. The method of claim 4, wherein said detecting includes determining when said rate or count exceeds a predetermined value.

6. A receiving method that comprises:
negotiating a link speed having PAM4 signaling;
performing adaption of at least one gain or filter coefficient during PAM2 signaling;
switching to PAM4 detection before receiving PAM4 signaling;
disabling said adaptation before said switching to PAM4 detection;
detecting PAM4 signaling using at least one statistic of detected PAM4 symbols;
enabling said adaptation after PAM4 signaling is detected; and
reducing a bandwidth of a clock recovery loop before said switching to PAM4 detection.

7. The method of claim 6, further comprising restoring the bandwidth of the clock recovery loop after PAM4 signaling is detected.

8. A receiver that comprises:
a controller that coordinates with a remote node to negotiate a link speed having PAM4 signaling;
an equalizer with at least one filter coefficient, the controller performing adaptation of the at least one filter coefficient during PAM2 signaling; and
a decision element that switches from PAM2 detection to PAM4 detection before receiving PAM4 signaling, the decision element initially using adjusted PAM4 detection values that cause PAM2 symbols to be detected only as outer PAM4 symbols,
the controller monitoring at least one statistic of symbols detected by the decision element to detect when PAM4 signaling is received, and
the controller disabling said adaptation before said switching to PAM4 detection, and enabling said adaptation after PAM4 signaling is detected.

9. The receiver of claim 8, wherein the adjusted PAM4 detection values are scaled by a factor of about 0.8 from nominal PAM4 detection values.

10. The receiver of claim 8, where said at least one statistic is a rate or count of detected inner PAM4 symbols, and wherein said detecting includes determining when said rate or count exceeds a predetermined value.

11. The receiver of claim 8, wherein the controller reduces a bandwidth of a clock recovery loop before said switching to PAM4 detection.

12. A method of receiving a data stream, the method comprising:
negotiating a link speed having PAM4 signaling;
adapting at least one of gain and filter coefficients during PAM2 signaling;
monitoring for a change in at least one signal characteristic while performing PAM2 detection, said change indicating reception of PAM4 signaling; and
transitioning to PAM4 detection after detecting said change.

13. The method of claim 12, wherein the at least one signal characteristic is a probability distribution of equalization error.

14. The method of claim 12, wherein the at least one signal characteristic is a range of equalization error.

15. The method of claim 12, wherein the at least one signal characteristic is a probability distribution of an equalized signal.

16. The method of claim 12, wherein the at least one signal characteristic is a range of an equalized signal.

17. A receiver that comprises:
a controller that coordinates with a remote node to negotiate a link speed having PAM4 signaling;
an equalizer with at least one filter coefficient, the controller performing adaptation of the at least one filter coefficient during PAM2 signaling; and
a decision element configured to switch from PAM2 detection to PAM4 detection,
the controller monitoring for a change in at least one signal characteristic while the decision element is configured for PAM2 detection and configuring the decision element for PAM4 detection after detecting said change, said change indicating reception of PAM4 signaling.

18. The receiver of claim 17, wherein the at least one signal characteristic is a probability distribution of equalization error.

19. The receiver of claim 17, wherein the at least one signal characteristic is a range of equalization error.

20. The receiver of claim 17, wherein the at least one signal characteristic is a probability distribution or a range of an equalized signal.

* * * * *